United States Patent
Mitchell et al.

(10) Patent No.: US 10,012,843 B2
(45) Date of Patent: Jul. 3, 2018

(54) COMPACT AND EFFECTIVE BEAM ABSORBER FOR FREQUENCY CONVERTED LASER

(71) Applicant: Sharp Kabushiki Kaisha, Osaka (JP)

(72) Inventors: Sarah Anne Mitchell, Oxford (GB); Tim Michael Smeeton, Oxford (GB); Noriaki Fujii, Osaka (JP); Valerie Berryman-Bousquet, Oxford (GB)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 15/208,980

(22) Filed: Jul. 13, 2016

(65) Prior Publication Data

US 2018/0017805 A1 Jan. 18, 2018

(51) Int. Cl.
G02B 27/28 (2006.01)
G02B 5/00 (2006.01)
G02B 5/30 (2006.01)
G02F 1/35 (2006.01)

(52) U.S. Cl.
CPC .......... G02B 27/283 (2013.01); G02B 5/003 (2013.01); G02B 5/3066 (2013.01); G02F 1/353 (2013.01)

(58) Field of Classification Search
CPC ....... G02F 1/353; G02B 5/003; G02B 5/3066; G02B 27/283
See application file for complete search history.

(56) References Cited

U.S. PATENT DOCUMENTS

| 3,566,099 | A | * | 2/1971 | Makas | G02B 27/283 |
| | | | | | 359/485.01 |
| 4,197,007 | A | * | 4/1980 | Costa | G01M 11/3154 |
| | | | | | 356/432 |
| 6,072,175 | A | * | 6/2000 | Wang | G02B 5/00 |
| | | | | | 250/216 |
| 8,559,471 | B2 | | 10/2013 | Mao | |

(Continued)

FOREIGN PATENT DOCUMENTS

| JP | 6-347847 | 12/1994 |
| JP | 2005-337715 | 12/2005 |

OTHER PUBLICATIONS

Tangtrongbenchasil et al. Tunable 220 nm UV-C Generation Based on Second Harmonic Generation Using Tunable Blue Laser Diode System, Japanese Journal of Applied Physics 47, p. 2137, (2008).

*Primary Examiner* — Daniel Petkovsek
(74) *Attorney, Agent, or Firm* — Renner, Otto, Boisselle & Sklar, LLP

(57) ABSTRACT

A light beam separating and absorbing element includes a mirror that receives first and second light beams incident on a first surface, and the mirror is configured to transmit the first light beam and reflect the second light beam. A beam absorber receives the first light beam transmitted through the mirror, and absorbs a first light portion of the transmitted first light beam after the first light beam has been transmitted through the mirror. The beam absorber scatters a second portion of the first light beam, and the beam absorber and mirror are positioned such that at least a portion of the scattered light is incident on a second surface of the mirror. Transmissivity of the mirror for the scattered light incident on the second mirror surface may be lower as compared to transmissivity for the first light beam incident on the first mirror surface to enhance separation of the first and second light beams.

19 Claims, 11 Drawing Sheets

(56) References Cited

U.S. PATENT DOCUMENTS

| | | | |
|---|---|---|---|
| 2004/0252379 A1* | 12/2004 | Weiss | G02B 5/003 |
| | | | 359/629 |
| 2007/0273277 A1* | 11/2007 | Fryer | F21V 14/003 |
| | | | 313/506 |
| 2009/0295681 A1* | 12/2009 | Kaminski | G02B 27/0018 |
| | | | 345/7 |
| 2011/0122896 A1 | 5/2011 | Mao | |
| 2012/0001061 A1* | 1/2012 | Zillmer | G02B 5/003 |
| | | | 250/216 |
| 2014/0047783 A1* | 2/2014 | Shalit | E06B 3/6722 |
| | | | 52/171.3 |
| 2015/0338719 A1 | 12/2015 | Meudndel et al. | |

* cited by examiner

COMPACT AND EFFECTIVE BEAM ABSORBER FOR FREQUENCY CONVERTED LASER

TECHNICAL FIELD

This invention relates to the structure of a beam absorber, for exemplary use to absorb light in frequency converted laser devices. The present invention may be used to absorb visible light in a device which uses nonlinear frequency conversion of visible light to generate ultraviolet light.

BACKGROUND ART

Nonlinear Frequency Conversion (NLFC) is a widely used optical technique for generating specific wavelengths using laser devices. In an NLFC device, light with a fundamental wavelength enters an NLFC component which converts some or all of the light with the fundamental wavelength into light with a converted wavelength. A common variation of this technique uses light with fundamental wavelength that is frequency-doubled, resulting in a converted wavelength which is half the fundamental wavelength, a process known as second harmonic generation (SHG). The NLFC process does not convert all of the light with the fundamental wavelength, leading to a spatial overlap of the light with the converted wavelength and light with the fundamental wavelength exiting the NLFC component.

Many applications for NLFC devices require only the light with the converted wavelength, so some or all of the light with the fundamental wavelength exiting the NLFC component must be removed. This may be achieved by the spatial separation of the two beams (fundamental and converted) and then absorption of the fundamental beam.

Frequency-doubling devices can be categorised depending on the polarisation properties of the fundamental and converted beam. In "type I" SHG the linearly polarised converted beam exiting the NLFC device has an orthogonal polarisation relative to the linearly polarised fundamental beam. The 90° change in polarisation can be exploited to separate the fundamental and converted beams by using Brewster mirror reflection, as taught in U.S. Pat. No. 8,559,471 (Mao, issued Oct. 15, 2013). A mirror which has high reflectivity to the converted beam and transmits the majority of the fundamental beam is oriented at the Brewster angle in a device described by Tangtrongbenchasil et al. [Japanese Journal of Applied Physics 47, 2137, (2008)].

Absorption of laser light may be achieved with a beam absorber—a cavity designed to trap the light—into which the laser light is directed. Some laser light may be reflected or scattered on contact with a beam absorber and can escape the beam absorber. Examples of beam absorbers designed to reduce this escaping scattered light are found, for example U.S. Pat. No. 8,047,663 (Pang et al., issued Nov. 1, 2011), where the beam absorber is fashioned as a tapered spiral terminating in an absorption chamber. However, such designs have the disadvantage of being comparatively difficult to manufacture and bulky compared to simpler cavities.

A combined wavelength rejection mirror and beam absorber is illustrated in Japanese Pat. App. No. 2005337715A (Toshiyasu et al., published Dec. 8, 2005), which includes wavelength rejection mirrors in a casing which may be configured to be absorbing.

SUMMARY OF INVENTION

This invention provides a light separating and absorbing element for exemplary use in a non-linear frequency conversion (NLFC) device. Unlike technologies in the prior art, this invention meets the requirements for a compact device which provides high performance wavelength separation and minimises scattered light from the separation process; specifically a high absorption of a first light beam and high reflection efficiency of a second light beam.

In an NLFC device, a first light beam emitted by a light source, and optionally acted on by one or more optical elements, propagates through an NLFC component and is partially converted by an NLFC process into a second light beam with a wavelength different from that of the first light beam. The first and second light beams exiting the NLFC component may be close to one another or partially or fully spatially overlapping, resulting in poor beam purity of the second light beam, which is unacceptable for many applications. This invention provides means for reducing the power of the first light beam which is coincident with the second light beam, resulting in a more pure second light beam.

In an aspect of the invention a combined light beam, comprising first and second light beams, is incident on a light separating and absorbing element which comprises at least a first mirror and a beam absorber. The first mirror may be configured such that the reflectivity of the first mirror is low for the first light beam and the reflectivity of the first mirror is high for the second light beam. Preferably the transmissivity of the first mirror is high for the first light beam. The part of the second light beam that is reflected from the first mirror is referred to herein as a reflected second light beam. The part of the first light beam that is transmitted through the first mirror is referred to herein as a transmitted first light beam. The transmitted first light beam is incident on a beam absorber which absorbs some fraction of the transmitted first light beam and reflects and scatters some of said light as scattered light. Scattered light as referred to herein is light originally in the transmitted first light beam which has been reflected or scattered at least once by the beam absorber. The beam absorber and mirror may be disposed relative to each other so that any scattered light that would escape from the beam absorber and propagate approximately in the same direction and spatial location as the reflected second light beam is incident on the first mirror. This configuration is advantageous in reducing escape of scattered light from the beam absorber, and therefore reducing the amount of scattered light escaping the NLFC device.

In another aspect of the invention, the first mirror may be configured so that the first light beam is incident on the first mirror at an angle of incidence close to the Brewster angle, and the linear polarisation of said beam is mostly p-type at the first mirror, and the reflectivity of the first mirror may be configured to provide high transmissivity of the first light beam and high reflectivity of the second light beam. For example, the first mirror may include multilayer coatings. Multilayer coatings allow for high selectivity of the beams, with small reduction in the power of the second light beam which is reflected, whilst strongly reducing the amount of the first light beam which is reflected by the first mirror in approximately the same direction as the reflected second light beam. This configuration is particularly suited to the case that the first light beam and second light beam have orthogonal linear polarisations.

In another aspect of the invention, the beam absorber may be configured to provide a relatively high probability that scattered light which is incident on the first mirror is not transmitted through the first mirror. This may be achieved by configuring the beam absorber so that there is a relatively high probability that scattered light which is incident on the first mirror is incident with at least one of an angle of incidence and linear polarisation for which the first mirror has a higher reflectivity for the scattered light than the reflectivity of the first mirror for the first light beam. For example, the shape of the beam absorber may be configured such that there is a relatively high probability that light from the first light beam which is scattered at least once from the beam absorber surfaces is incident on the first mirror at high angle of incidence. Alternatively, or additionally, the surfaces of the beam absorber may be configured so that scattered light which is incident on the first mirror has a polarisation ratio of s- to p-polarisation (i.e. power of s-type divided by power of p-type) that is higher than said polarisation ratio for the first light beam incident on the first mirror. This may provide a favourably low probability that scattered light is transmitted through the first mirror and escapes from the beam absorber. In particular, this may provide a favourably low probability that the scattered light which, if transmitted through the first mirror would propagate approximately in the same direction as the reflected second light beam, is transmitted through the first mirror.

In another aspect of the invention, the first mirror may be configured to provide a relatively high probability that scattered light which is incident on the first mirror is not transmitted through the first mirror. This may be achieved by configuring the first mirror to have high reflectivity to scattered light, reflecting the scattered light back into the beam absorber and reducing scattered light escaping from the beam absorber. The reflectivity of the first mirror second surface may be configured through the use of multilayer coatings. This aspect provides another opportunity to reduce the probability that scattered light escapes from the beam absorber.

In a further aspect of the invention the beam absorber and first mirror may be disposed in optical contact, i.e. physical contact with one another, thereby preventing propagation of light between the beam absorber and the first mirror in the regions where said components are in physical contact. This ensures that some or all of the scattered light that would propagate out of the beam absorber must first be incident on the first mirror. This is advantageous in reducing escape of scattered light out of the beam absorber, since the scattered light may be reflected back into the beam absorber by the first mirror. Further advantages are that the physical size of the light separating and absorbing element is minimised, by eliminating any physical space between the components. Another advantage is providing favourably simple and low-cost manufacturing of the light separating and absorbing element, as the beam absorber may be configured to provide support for the first mirror.

Another aspect of this invention utilises an angle-selective light shield to reduce propagation of scattered light in directions similar to the direction of the reflected second light beam. The light shielding device is configured to allow the reflected second light beam to pass through unobstructed, but blocks light that is not similar in both direction and spatial location to the reflected second light beam. This light shield is advantageous in reducing scattered light within the NLFC device, not only light scattered by the beam separating and absorbing element, but also from other components within the device.

Advantages of the present invention may include without limitation:

effective beam separation, due to the use of effective separation and absorption of the first light beam from the second light beam.

high transmission efficiency of the second light beam through the light beam separating and absorbing element (e.g. >95%).

low cost design, due to the use of minimal components and the potential to use inexpensive materials.

compact format, due to the configuration of the components within the light beam separating and absorbing element.

reduction in onward propagation of scattered light in the NLFC device due to an angle and position selective light shielding device.

an NLFC device which emits a frequency-converted light beam (second light beam) with a high ratio of the power of the frequency-converted light beam divided by the power of the fundamental light beam (first light beam).

The invention is particularly advantageous to enable compact NLFC devices which generate deep ultraviolet light (wavelength less than 270 nm) by type 1 SHG using laser diodes to generate the first light beam. There is a need for a wavelength separating element with these properties because the demand for sources in the deep ultra-violet spectral region is increasing. Separation of the first and second light beams is important to the functionality of these devices.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF REFERENCE NUMERALS

Figure 1:
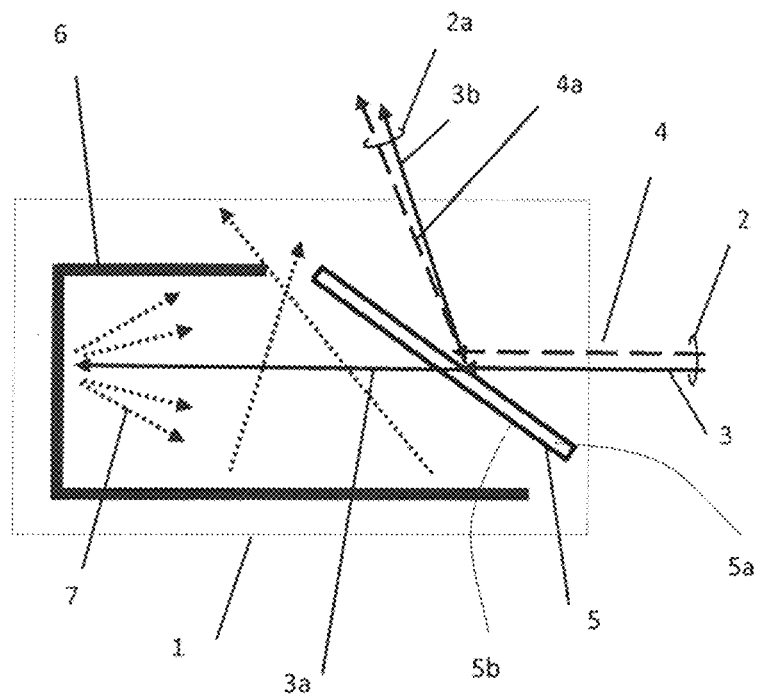
FIG. 1 illustrates the combined beam entering an exemplary light beam separating and absorbing element.

1. Light beam separating and absorbing element
2. Combined beam
2a. Onwards propagating beam
3. First light beam
3a. Transmitted first light beam
3b. Reflected first light beam
4. Second light beam
4a. Reflected second light beam
5. First mirror
5a. First mirror first surface
5b. First mirror second surface
6. Beam absorber
6a. Beam absorber top surface
6b. Beam absorber bottom surface
7. Scattered light
7a. Mixed scattered light
8. Opaque blocking material
9. Light tunnel
10. Internal surfaces of beam absorber.
11. Mirror with coating on second surface
12. Cooling elements
13. Laser diode
14. Optical element(s)
15. NLFC element (e.g. β-BBO)
16. Filter
17. Laser light
18. Output beam
19. Device housing

DETAILED DESCRIPTION OF INVENTION

An NLFC device may include a light source which emits light, an NLFC component, one or more optional optical elements which act on the light before it is incident on the NLFC component, and a beam separating and absorbing element. Light incident on the NLFC component is referred to herein as a first light beam. The first light beam enters the NLFC component, which converts some or all of the first light beam into a second light beam. The power of the second light beam which propagates out of the NLFC component may be significantly less (e.g. up to six orders of magnitude less) than the power of the first light beam which propagates out of said component. Thus, it is often necessary to filter or otherwise separate the two light beams to obtain an output beam in which the majority of power comes from the second light beam.

This invention provides a light beam separating and absorbing element for the compact and effective separation of one light beam from a combined beam comprising two light beams (e.g., the first and second light beams). This invention is particularly suited to the separation of two orthogonal polarisations of light. This effective separation includes both a separation stage, with high transmission of the first light beam and high reflection of the second light bean, and also means to efficiently absorb the first, transmitted, light beam.

In a first aspect of the invention, two light beams to be separated are incident on a first mirror. The first light beam may be substantially transmitted through the first mirror and the second light beam may be substantially reflected by the mirror. Transmission of the first light beam (i.e. ratio of the power of light transmitted through the mirror divided by the power of light incident on the mirror) is preferably >50%, more preferably >90%, and still more preferably >99%. Reflection of the second light beam is preferably >50%, more preferably >90%, and still more preferably >99%.

The part of the second light beam that is reflected from the first mirror propagates as a reflected second light beam. A beam absorber may be located in close proximity to the first mirror such that part of the first light beam which is transmitted through the mirror (the transmitted first light beam) is incident on the beam absorber. The beam absorber may be made from a material such as aluminium, zinc alloy, graphite, steel, or stainless steel. The beam absorber is configured to absorb some of the transmitted first light beam which is incident on the beam absorber. Preferably the beam absorber absorbs at least 50% of the transmitted first light beam, more preferably >90%, and still more preferably >99%. Part of the transmitted first light beam which is not absorbed by the beam absorber may be scattered as scattered light. Scattered light is light from the transmitted first light beam which has been reflected or scattered at least once by the beam absorber. The beam absorber and first mirror may be disposed relative to each other so that any scattered light that would escape from the beam absorber and propagate approximately in a direction and spatial location of the reflected second light beam is incident on the first mirror. Thus, the first mirror may advantageously reflect some of the scattered light back into the beam absorber that would otherwise propagate approximately in a direction of the reflected second light beam.

Accordingly, an aspect of the invention is a light beam separating and absorbing element. In exemplary embodiments, the element may include a mirror that receives a first light beam and a second light beam, and the mirror is configured to transmit the first light beam and to reflect the second light beam. The element further may include a beam absorber configured to receive the first light beam transmitted through the mirror, and to absorb a first light portion of the first light beam after the first light beam has been transmitted through the mirror. The beam absorber may scatter a second portion of the first light beam into scattered light, and the beam absorber and the mirror are disposed relative to each other such that at least a portion of the scattered light is incident on the mirror. The first and second light beams may be incident on a first surface of the mirror, and the scattered light may be incident on a second surface of the mirror opposite from the first surface of the mirror. In general, transmissivity of the mirror for light of the scattered light incident on the second surface of the mirror may be lower as compared to transmissivity for light of the first beam incident on the first surface of the mirror to enhance separation of the first and second light beams.

An exemplary embodiment of the present invention is illustrated in FIG. 1, which shows the combined beam 2 incident on the light beam separating and absorbing element 1. The combined beam 2 comprises a first light beam 3 and a second light beam 4 which may be spatially overlapping with the first light beam 3. The combined beam 2 is incident on a first surface 5a of a first mirror 5. The first surface 5a may be configured to have high transmission to the first light beam 3 and high reflectivity to the second light beam 4. The part of the first light beam which is transmitted through the first surface 5a propagates through one or more materials comprising the first mirror 5 (which are preferably substantially transparent to said light), and through the second surface 5b, which is preferably configured to have a high transmission to said light. Thus the first light beam 3 is substantially transmitted through the first mirror 5 as transmitted first light beam 3a. Some of the first light beam 3 may be reflected by one or both of the first and second surfaces 5a, 5b of the first mirror as one or more beams which are collectively referred to as a reflected first light beam 3b.

The second light beam 4 is substantially reflected from the first mirror 5 as reflected second light beam 4a. Thus, in an onwards propagating beam 2a that is the combined beams 4a and 3b, the ratio of the power of the reflected second light beam 4a divided by the power of the reflected first light beam 3b is significantly higher than the equivalent ratio of the second light beam 4 and first light beam 3 in the combined beam 2. Preferably the ratio of (power of transmitted first light beam 3a/power of first light beam 3) is >0.99 and the ratio of (power of reflected second light beam 4a/power of second light beam 4) is >0.99.

A beam absorber 6 may be disposed relative to the first mirror 5 such that the transmitted first light beam 3a is incident on the beam absorber 6 after transmission through the first mirror 5. The beam absorber 6 is configured to be highly absorbing to the transmitted first light beam 3a, preferably absorbing >90% of the incident light and more preferably >99% absorbing, such that most of the transmitted first light beam 3a is absorbed on contact with the beam absorber 6. Any light from the transmitted first light beam 3a which is not absorbed by the beam absorber 6 will be reflected or scattered from the beam absorber surfaces as scattered light 7 (reflected and scattered components of the transmitted first light beam 3a will be collectively termed scattered light 7, which it should be understood may include specular and non-specular components). The beam absorber 6 may be preferably disposed relative to the first mirror 5 such that any scattered light 7 that would be incident on the optical element next encountered by the onwards propagating beam 2a is incident on the second surface 5b of the first mirror 5, and more preferably such that any scattered light 7 which would ultimately propagate out of the NLFC device either directly along the path of the onwards propagating beam 2a or through alternative optical paths, is incident on the second surface 5b of the first mirror 5.

By substantially transmitting the first light beam 3 and substantially reflecting the second light beam 4, the light beam separating and absorbing element 1 provides an onwards propagating beam 2a that is improved in purity of the second light beam as compared to the combined beam 2. This aspect is advantageous because it allows for effective separation of the two light beams by simple means. Utilising simple components for the light beam separating and absorbing element ensures that the cost and complexity of such a device is kept to a minimum. Advantageously, the proportion of the first light beam 3 in the onwards propagating light beam 2a is reduced by minimising the scattered light 7 that can contribute to the onwards propagating light beam 2a. A further advantage is that, by placing the beam absorber 6 close to the first mirror 5, the light beam separating and absorbing element 1 is made compact.

In exemplary embodiments, the first light beam may have a first polarization and the second light beam may have a second polarization different from the first polarization. The mirror may be configured to have higher transmissivity of light of the first polarization relative to the second polarization, and higher reflectivity of light of the second polarization relative to the first polarization. In cases where the first light beam 3 and second light beam 4 have substantially orthogonal polarisation, the first mirror may be configured to improve the effectiveness of separation of the beams based on polarisation. For example, if >50%, preferably >90%, and more preferably >99% of the power in the first light beam 3 is linearly polarised in a first polarisation direction, then the first mirror 5 may be configured so that the first polarisation direction in the first light beam 3 is p-type polarised with respect to the first mirror 5. In this scenario the first mirror 5 may be oriented to enable a significant fraction—preferably >90% and more preferably >99%—of the first light beam 3 to be transmitted through the first mirror 5.

Figure 2:
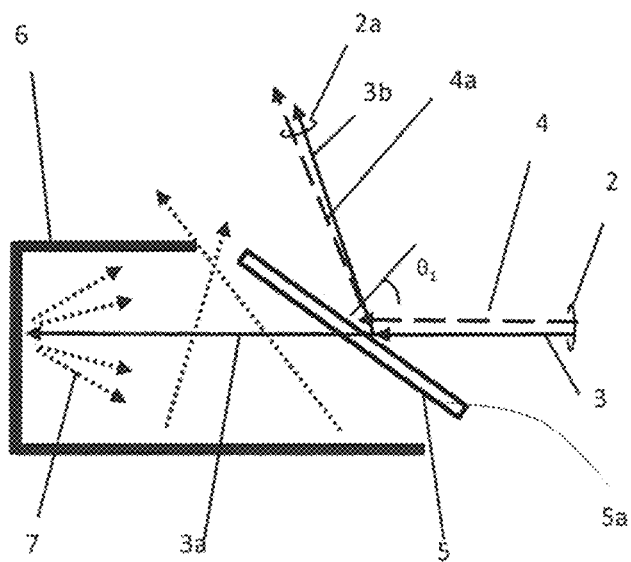
FIG. 2 illustrates the combined beam incident on a first mirror surface with an angle of incidence $\theta_1$.

Enhanced separation based on polarisation is illustrated in FIG. 2, which shows the combined beam 2, comprising the first light beam 3 and second light beam 4 incident on the first mirror 5 with a first angle of incidence $\theta_1$. To obtain low reflectivity ($R_p$) to the first light beam 3 with p-type polarisation at the first mirror 5, it is advantageous to use an angle of incidence approximately equal to the Brewster angle. The Brewster angle may be determined from:

$$\tan\theta_{Br} = \frac{n_{trans}}{n_{prop}} \qquad (1)$$

where $\theta_{Br}$ is the Brewster angle, $n_{prop}$ is the refractive index for the first light beam in the medium before said beam is incident on the first surface 5a of the first mirror 5, and $n_{trans}$ is the refractive index for the first light beam in the medium after the first light beam has propagated through the first mirror first surface 5a. If the combined beam 2 is initially propagating in air or a gas then $n_{prop} \approx 1.0$.

When the Brewster angle condition is satisfied, the reflectivity of a p-polarised beam becomes close to zero ($R_p \approx 0$). Thus, the power of the reflected first light beam 3b is very substantially lower than the power of the first light beam.

The purity of the onwards propagating beam 2a as to the second light beam may be further assured by the reduction of scattered light which propagates approximately in the direction of the onwards propagating beam 2a. This aspect of the invention is advantageous because a Brewster angle interface is a relatively simple and inexpensive component in an optical system, giving this embodiment a commercial advantage over more expensive components such as polarisers. A Brewster angle interface is also robust against damage from high power beams, which can cause damage to optical coatings.

In a further aspect, in cases where the first light beam 3 and second light beam 4 are separated in polarisation and wavelength (for example as a result of type 1 SHG), the first mirror 5 may be both aligned at the Brewster angle and have a coating configured to maximise the reflection of the second light beam 4. For example, a distributed Bragg reflector (DBR) coating can give reflectivity >99% on an interface for a specific wavelength. Thus p-polarised light in the first light beam 3 may be transmitted through the first mirror 5 by utilising the Brewster angle, and the second light beam 4, comprising s-polarised light of a second wavelength, may be reflected with a high reflection coefficient.

Figure 3:
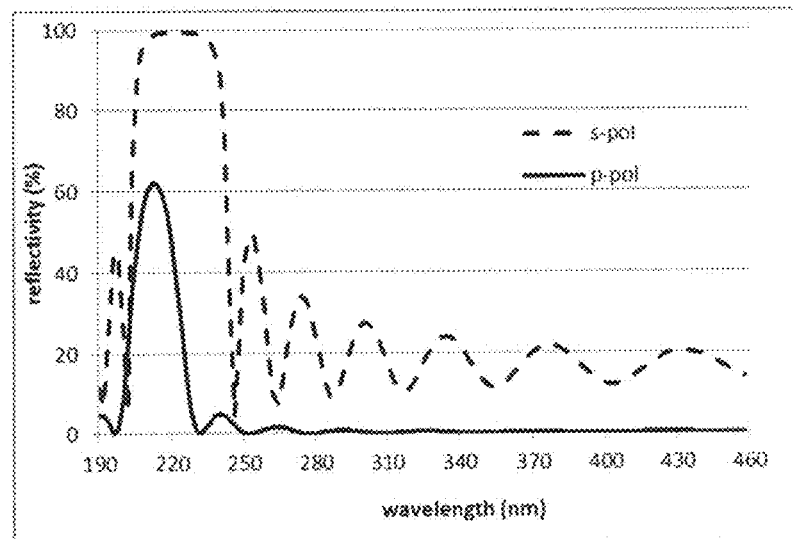
FIG. 3 illustrates the reflectivity of an exemplary DBR mirror.

FIG. 3 shows the reflectivity of a DBR mirror in an example for angle of incidence=56° and wavelengths in the range 190-460 nm; as can be seen, there is high reflectivity of s-polarised light at wavelengths around λ=220 nm and low reflectivity of p-polarised light around λ=440 nm. A high reflectivity coating such as this is advantageous because it ensures that optical losses of the second light beam 4 in the wavelength separation and absorbing element 1 are minimised. This is particularly important because the second light beam produced in NLFC devices is often many orders of magnitude lower power than the first light beam, and losses are therefore highly non-desirable.

In exemplary embodiments, the first light beam may be incident on the first surface of the mirror at a first angle of incidence. The beam absorber may be configured such that at least a portion of the scattered light is incident on the second surface of the mirror at a second angle of incidence different from the first angle of incidence. Transmissivity of the mirror for light of the scattered light may be lower at the second angle of incidence as compared to the first angle of incidence.

In particular, the second angle of incidence may be in approximately a same direction of propagation as a direction of the second light beam as reflected by the mirror, so that the mirror does not transmit scattered light that otherwise would overlap with the reflected second light beam. Scattered light that would overlap with the reflected second light beam may be defined as including any components of scattered light in a same spatial location as the second reflected light beam at any subsequent point on the optical path of the reflected second light beam.

Figure 4:
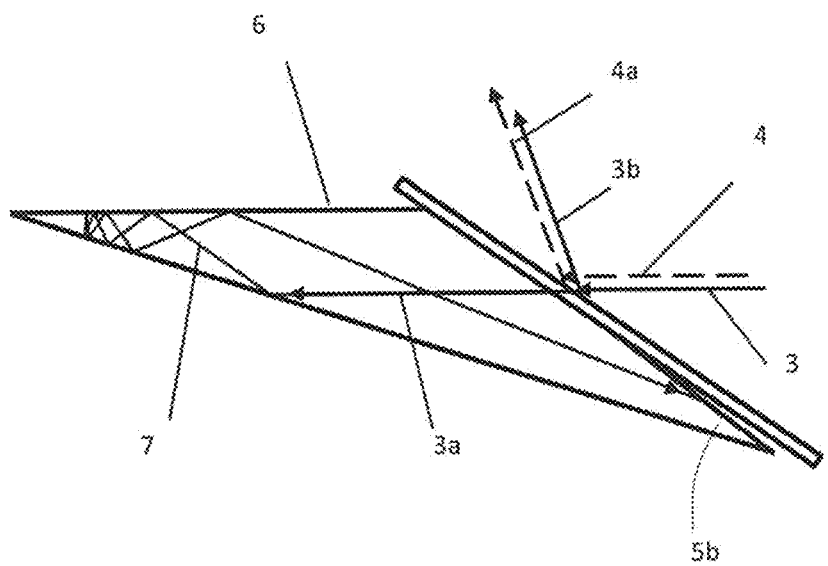
FIG. 4 illustrates an exemplary configuration of a beam absorber internal shape and a ray trace of a ray within the beam absorber.

In this further aspect of the invention, illustrated in FIG. 4, the beam absorber 6 may be configured so that a significant fraction of the scattered light 7 which is incident on the first mirror surface has an angle of incidence at the first mirror 5 which is different from the angle of incidence of the first light beam 3 on the first mirror 5. This may be obtained, for example, through configuration of at least one of: the internal shape of the beam absorber; and/or the one or more materials in the beam absorber and the surface texture of said materials. This aspect of the invention is advantageous because escape of scattered light from the beam absorber can be reduced without the need for extra components.

The first mirror 5 may be configured to substantially transmit the first light beam 3 which is incident on the first mirror 5 at a first angle of incidence. An undesirable consequence of this is that scattered light 7 which is incident on the first mirror 5 at said angle of incidence may also be substantially transmitted through the first mirror 5. According to this aspect of the invention, the beam absorber is configured so that a significant fraction of the scattered light 7 which is incident on the first mirror has an angle of incidence at the first mirror 5 which is different from the first angle of incidence. The fraction of the scattered light may be greater than 20%, preferably greater than 50%, and most preferably greater than 90%.

Figure 5:
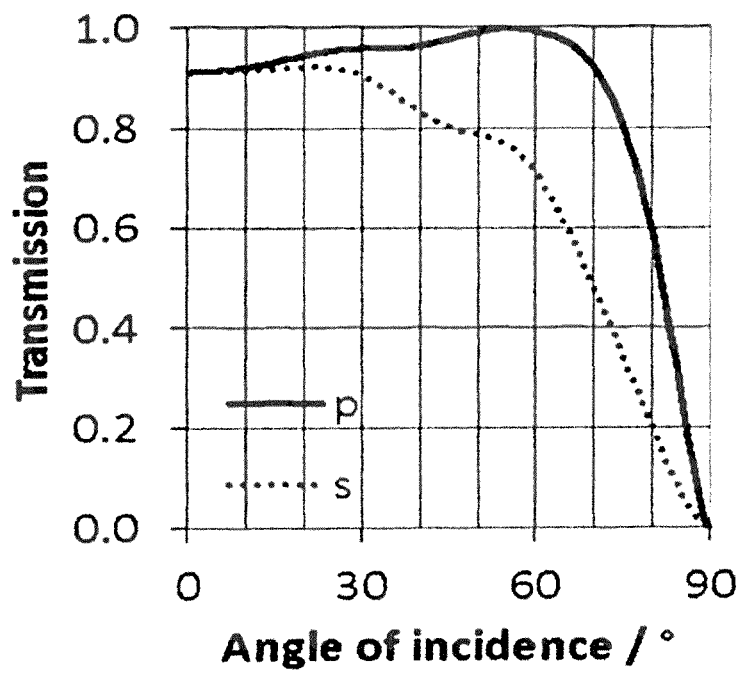
FIG. 5 illustrates the dependence of transmission on angle of incidence for an exemplary first mirror.

Furthermore, the first mirror may be configured such that transmission of scattered light incident on the first mirror with an angle of incidence different from the first angle of incidence is lower than the transmission of scattered light with an angle of incidence equal to the first angle of incidence. FIG. 5 illustrates the dependence of transmission on angle of incidence for an exemplary first mirror. This transmission is the same for light propagating through the mirror in either direction (i.e. incident on the first surface 5a or on the second surface 5b of the first mirror). The plot shows the transmission of light with s-type and p-type polarisation through a mirror for different angles of incidence. This example is for a DBR mirror deposited on a UV fused silica substrate and applies to a wavelength of approximately 440 nm (i.e. as explained in more detail in Example 1), but is introduced here to illustrate general features of a suitably configured first mirror. The first light beam 3 which is incident on the first mirror has a first angle of incidence approximately equal to the Brewster angle; in this example approximately 56°. Transmission of the p-polarised light in the first light beam through the first mirror 5 is very high, which is advantageous for effective transmission of the first beam towards the beam absorber.

The beam absorber is configured so that a significant fraction of the scattered light 7 which is incident on the first mirror has an angle of incidence different from the first angle of incidence. In combination with a first mirror with reflectivity configured as illustrated in FIG. 5, the transmission of the scattered light through the first mirror is favourably low because the transmission of light through the mirror is lower for angles of incidence different from the first angle of incidence than for angles of incidence equal to the first angle of incidence.

The favourably low transmission of scattered light through the first mirror results in a favourably high fraction of scattered light being reflected at the first mirror and therefore remaining inside the beam absorber 6. For example, at 80° angle of incidence, p-polarised light is approximately 60% transmitted, compared to 99% for a first angle of incidence of approximately 56°.

In a preferred example, the shape of the beam absorber may be configured to ensure that scattered light which is scattered or reflected in approximately specular directions (i.e. angle of reflection or scatter is within approximately 20° of angle of incidence) at one or more surfaces of the beam absorber, and which is ultimately incident on the first mirror is incident on the first mirror with an angle of incidence larger than the first angle of incidence. Reflection or scatter mostly in approximately specular direction may be especially relevant if a coating inside the beam absorber degrades.

Figure 6:
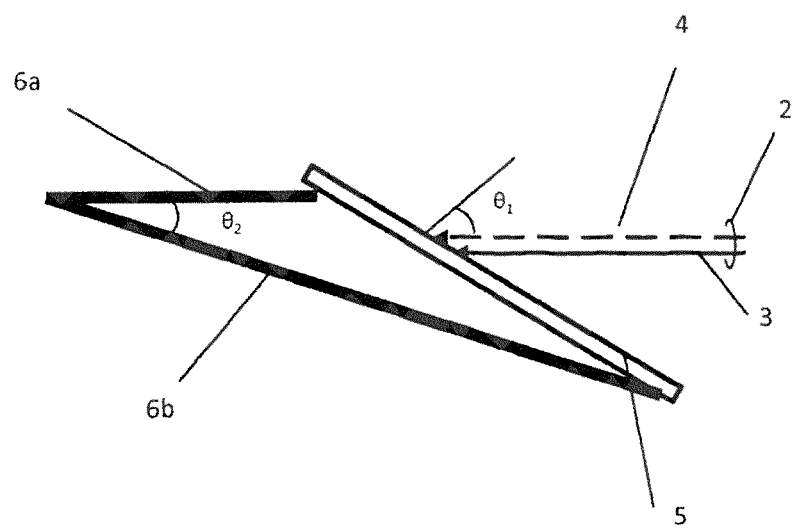
FIG. 6. illustrates the case where the angle between a beam absorber top surface and a beam absorber bottom surface is $\theta_2$.
Figure 7:
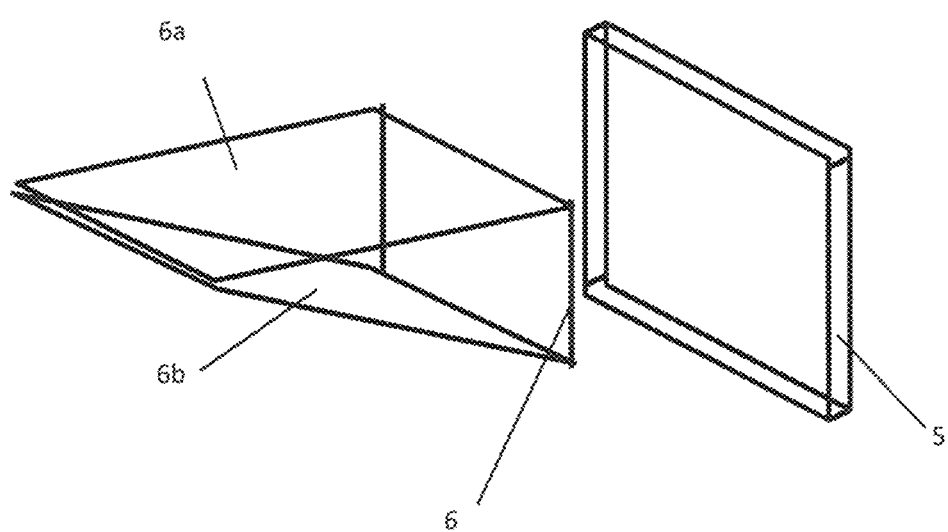
FIG. 7 illustrates an alternative view of the configuration of the exemplary beam absorber of FIG. 6.

For example, a first surface of the beam absorber may be angled at an acute angle relative to a second surface of the beam absorber. An exemplary beam absorber shape is illustrated in FIGS. 6 and 7. FIG. 6 illustrates an exemplary configuration where, for a first angle of incidence of $\theta_1$=56° between the combined beam 2 and first mirror 5, the angle between a beam absorber top (first) surface 6a and a beam absorber bottom (second) surface 6b is $\theta_2$=16°. FIG. 7 shows an alternative view of the configuration of the beam absorber 6 and first mirror 5 of FIG. 6. As can be seen, the internal profile of the beam absorber 6 is square or rectangular in cross section, with the bottom surface 6b angled up towards the top surface 6a.

Referring back to FIG. 4 which shows a beam absorber shape comparable to FIGS. 6 and 7, FIG. 4 illustrates the trace of a single ray in such a beam absorber, as calculated by optical ray tracing simulations. Tracing multiple rays shows that for this configuration of the internal surface of the beam absorber, approximately 40% of the scattered light 7 is incident on the mirror at 76°, with the other 60% split approximately equally between angles of incidence 36° and 68°. Referring back to FIG. 5, it can be seen that transmission is reduced compared to the Brewster angle (56°) for all these angles of incidence, but in particular, at 76° transmission is only ~70% of the Brewster angle transmission.

FIGS. 6 and 7 illustrate just one possible option for the internal shape of the beam absorber 6 which has the advantage of being relatively simple to manufacture. There are, however, many possible configurations of the internal surfaces of the beam absorber which would fulfil this aspect of the invention.

The configuration described thus provides advantageously high transmission of the first light beam through the first mirror 5, and advantageously low transmission of scattered light 7 through said mirror.

Beam separation also may be enhanced based further on polarisation. In exemplary embodiments, the first light beam may be incident on the first surface of the mirror having a first polarization. The beam absorber may be configured such that at least a portion of the scattered light is incident on the second surface of the mirror with a second polarization different from the first polarization, and the transmissivity of the mirror for light of the scattered light is lower at the second polarization as compared to the first polarization. For example, the beam absorber may have internal surfaces with a surface texture that changes a fraction of light incident on the surface texture from the first polarization to the second polarization.

Figure 8:
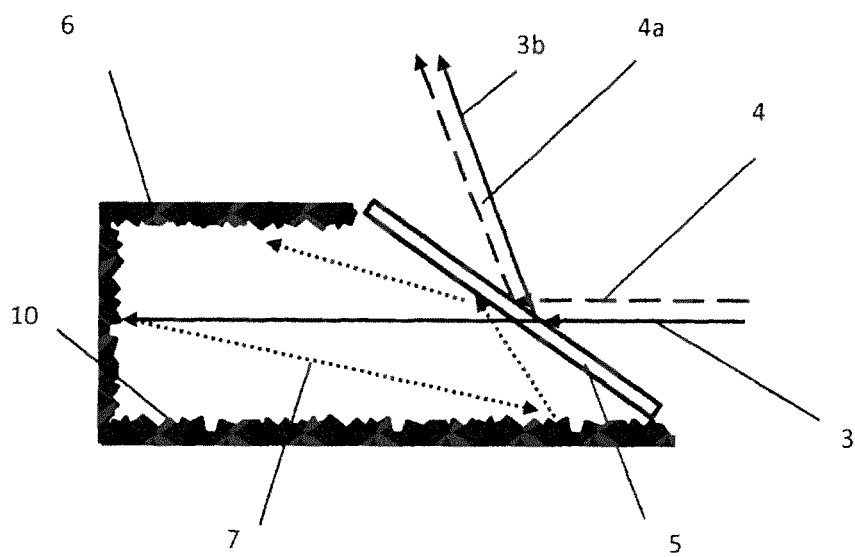
FIG. 8 Illustrates the internal surfaces of the beam absorber with a surface texture.

In this further aspect of the invention, as shown for example in FIG. 8, internal surfaces 10 of the beam absorber 6 may be configured such that scattered light 7 which is incident on the first mirror 5 has, on average, a different value of the fraction of power of light with s-type linear polarisation divided by total power of light than the equivalent fraction for the first light beam incident on the first mirror.

The internal surfaces 10 of the beam absorber may be configured such that incident light (i.e. light incident on an internal surface) with a first polarisation fraction (i.e. of the power of light with s-type polarisation divided by the total power of light) is scattered as scattered light with a polarisation fraction which is different from the first polarisation fraction. For example, some or all of the internal surfaces 10 may be configured with a texture which causes a change in polarisation fraction. FIG. 8 illustrates this example, where the internal surfaces 10 of the beam absorber 6 are shown schematically to have a surface texture. Surface texture (e.g. roughness) including features with dimensions close to or smaller than the wavelength of the incident light are particularly effective for changing the polarisation fraction between incident light and scattered light.

In the example that the first light beam 3 is substantially p-polarised with respect to the first mirror, and that the internal surfaces 10 of the beam absorber 6 are configured according to this aspect, scattered light which is incident on the first mirror 5, has a higher polarisation fraction of power of s-type polarisation divided by total power at the first mirror than the equivalent fraction for the first light beam incident on the first mirror. More than one scattering event off the internal surfaces 10 of the beam absorber 6 will further increase the s-polarisation component in the scattered light 7 incident on the first mirror. For example, if the first light beam 3 comprises light with s-polarisation component that is ≤1% of the total power, scattering from the beam absorber internal surfaces 10 increases the s-polarisation divided total power to >1% for the scattered light 7 which is incident on the first mirror. Preferably, the fraction is increased up to approximately 50% of the power in the scattered light 7 incident on the first mirror.

The first mirror 5 may be configured so that the transmission of scattered light which is incident on the first mirror is lower than the transmission of the first light beam through the first mirror, owing to the change in fraction of s-type polarised light. For example, a mirror configured to have reflectivity which is higher for s-polarised light than for p-polarised light is suitable for the current example. A mirror with transmission shown in FIG. 5 (as introduced in the description of a previous aspect) is a suitable example. If the first light beam 3 is mostly p-polarised, transmission through the first mirror with properties illustrated in FIG. 5 is very high for a first angle of incidence of approximately 56°; scattered light incident on the first mirror which has a higher s-type polarisation component is transmitted much less for nearly all angles of incidence of the scattered light at the first mirror. Therefore s-polarised light is more likely to be trapped, and ultimately absorbed, inside the beam absorber 6, and the propagation of scattered light in the approximate direction and spatial location of the reflected second light beam is favourably small.

High scattering requires either that the internal surfaces of the beam absorber 10 are inherently scattering—by rough or otherwise textured surfaces—or by inclusion of a scattering coating. Examples of suitable surfaces include: anodised layers (optionally including a dye in the anodised layer) formed on aluminium, steel or stainless steel; silicon; graphite coatings; and absorptive glass (i.e. glass which absorbs some or all of the light)

Figure 9:
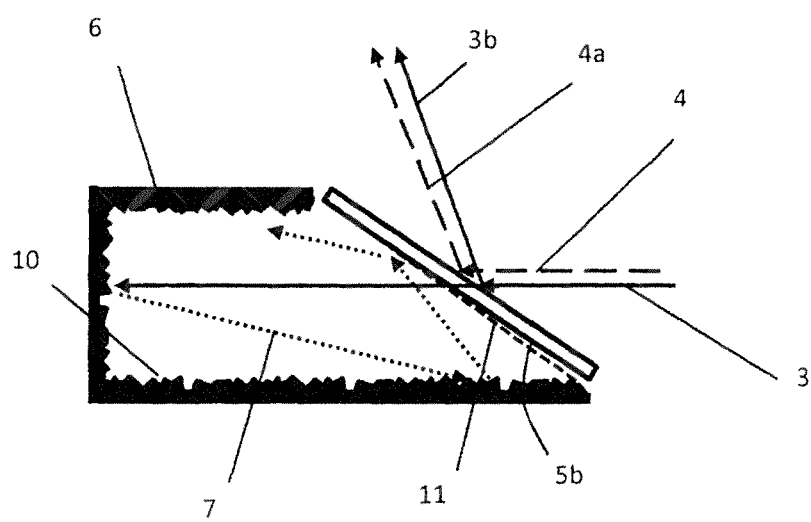
FIG. 9 Illustrates the addition of a coating on the second surface of the first mirror.

In another aspect of the invention, illustrated in FIG. 9, the second surface 5b of the first mirror 5 may be configured to further improve the effectiveness of the beam separating and absorbing element. For example, the second surface 5b may include a coating 11 configured to reduce transmission of scattered light incident on the second surface of the mirror. Transmission of scattered light 7 through the first mirror may be reduced if a coating 11 is included on the second surface of the first mirror 5b, with the coating configured to reduce the transmission of scattered light 7 that is incident on the mirror second surface. The coating 11 may be configured to reduce transmission for scattered light owing to at least one of the polarisation or angle of incidence of the scattered light.

Suitable coatings would have high transmission for the first light beam 3 (as for the first surface 5a; e.g. preferably >99%) for polarisation of the first light beam and for angle of incidence equal to the first angle of incidence, and low transmission to the scattered light 7 at angles of incidence different from the first angle of incidence and/or for the polarisation different from the polarisation of the first light beam at the first mirror. Multilayer optical coatings can be suitably configured. A specific advantage of the use of a coating 11 on the second surface 5b is that, unlike the first surface 5a of the first mirror 5, the coating 11 does not need to also have function to reflect the second beam. Therefore, the design of the coating 11 has fewer constraints than for the configuration of the first surface, and the coating 11 can therefore be designed to provide more favourably low transmission of scattered light 7.

Figure 10:
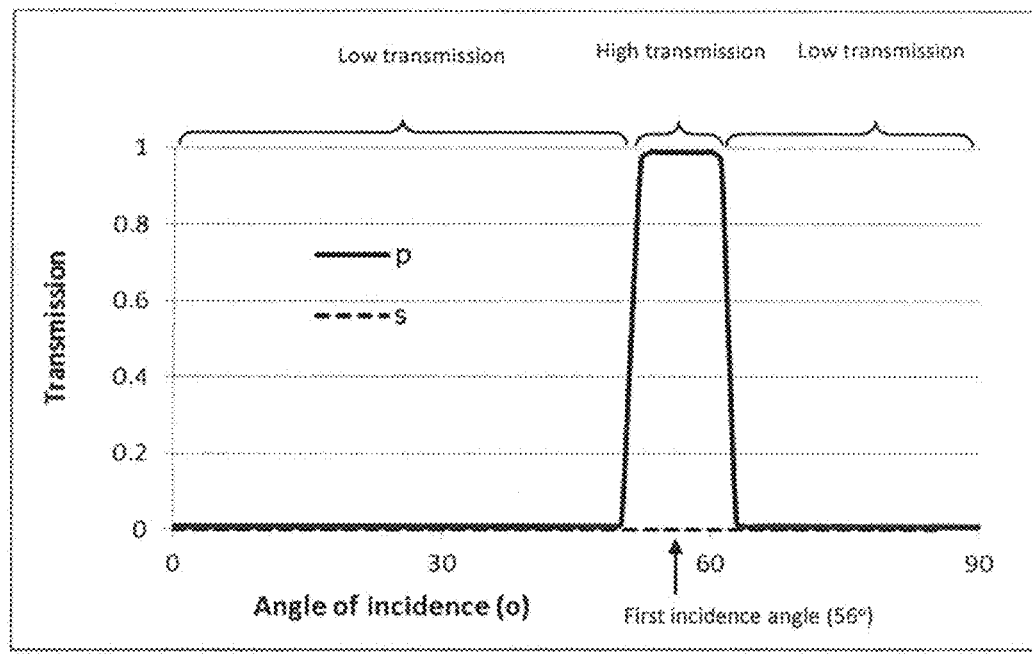
FIG. 10 Illustrates schematically transmission properties of an exemplary coating suitable for the second surface of the first mirror.

The use of the coating 11 on the second surface 5b is particularly relevant for the example of an SHG device in which the fundamental light (first light beam) includes a wavelength in the range 400~600 nm, and the frequency converted light (second light beam) includes a wavelength in the range 200~300 nm. In this case, the first mirror surface must have high reflectivity for light with wavelength in the range 200~300 nm, and high transmission for light with wavelength 400~600 nm. Relatively few optical materials are suitable to provide mirrors with high reflectivity for a wavelength 200~300 nm (and especially few for wavelengths 200~240 nm), so it becomes necessary to use materials and designs which cannot also provide the lowest transmission of scattered light 7. For example, mirrors with high reflectivity for wavelength 200~240 nm may be produced using multilayers of durable fluoride materials, but the total thickness of durable fluoride materials which may be deposited on a surface before cracking occurs is small; therefore, it is not possible to produce complex multilayer mirrors which may provide low transmission for scattered light 7. In contrast, the coating 11 on the second surface 5*b* only needs to have function for a wavelength in the range 400~600 nm, and therefore may be designed to provide very high transmission for the first light beam, and low transmission for scattered light (e.g. based on at least one of the polarisation of scattered light and angle of incidence of scattered light). FIG. 10 shows schematically example transmission properties of such a coating for the wavelength of the first light beam; this coating would be suitable where the first incidence angle is 56°. It should be noted that the properties of the coating in FIG. 10 are very favourable; more imperfect transmission or range of angles for transmission would still be advantageous and are in scope of the invention.

In another example, the coating 11 may be configured to provide high transmission of the first light beam 3 through the second surface 5*b* of the first mirror 5.

In another example, the configurations for the first and second surfaces as described throughout this disclosure may be interchanged, such that the configuration ascribed herein to the first surface is used for the second surface, and vice versa.

Figure 11:
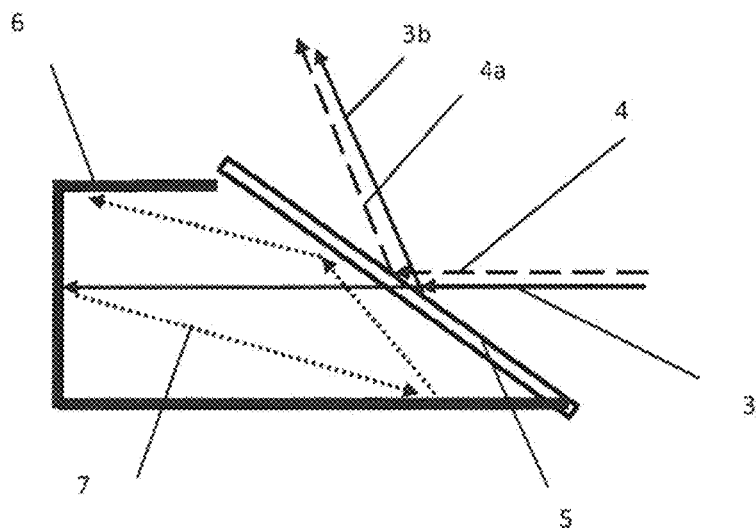
FIG. 11 illustrates a schematic view of a configuration of the beam absorber and first mirror in complete optical contact.
Figure 12:
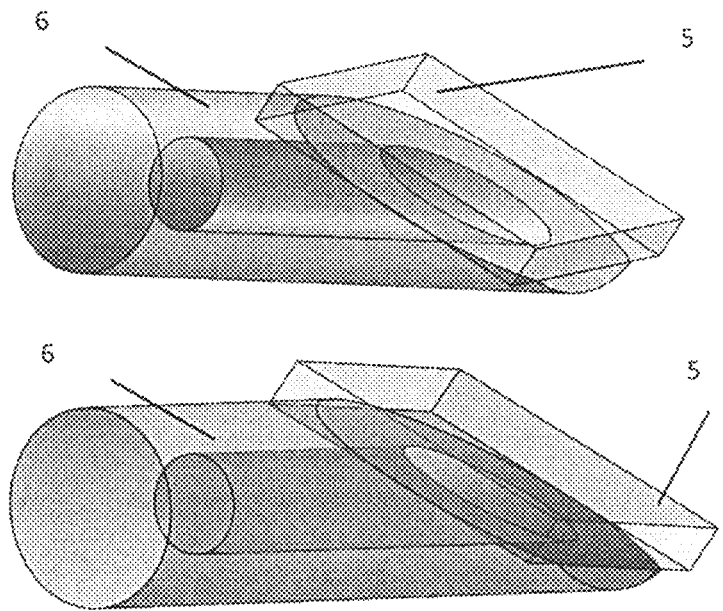
FIG. 12 illustrates two perspective views of a configuration of the beam absorber and first mirror in complete optical contact.

In a further aspect of the invention the first mirror 5 and beam absorber 6 may be at least partially in optical contact with each other, i.e. in physical contact with one another, thereby reducing or preventing propagation of scattered light from exiting the light beam separating and absorbing element between the beam absorber and the first mirror in the regions where said components are in physical contact. The beam absorber and first mirror may be in partial optical contact, whereby some but not all of the opening of the beam absorber is in optical contact with the first mirror. Alternatively, the beam absorber and first mirror may be entirely in optical contact, whereby there the opening of the beam absorber is entirely sealed by optical contact with the first mirror. An example of this aspect is illustrated in FIGS. 11 and 12, for the case that the first mirror is in complete optical contact with the beam absorber. This configuration minimises the scattered light 7 able to escape the beam absorber 6 since all scattered light 7 which might escape the beam absorber is incident on the first mirror 5 and may be reflected back into the beam absorber.

This aspect has advantages for device miniaturisation, since the beam absorber and first mirror require the minimum space possible as they are in physical contact. Another advantage is in the manufacturing of the light separating and absorbing element, as the beam absorber may be configured to provide mechanical support for the first mirror, further reducing the need for additional components. A further advantage of this aspect is that it is known that surfaces of beam absorbers can degrade over time, particularly if the light incident on the surface has high power. Examples of surfaces which degrade include graphite and anodised coatings on aluminium or steel. If the first mirror and beam absorber are in complete optical contact, the first mirror will prevent contamination of other components in the NLFC device, because any gaseous or particulates released due to degradation of the beam absorber are sealed in the beam absorber by the first mirror.

Figure 13:
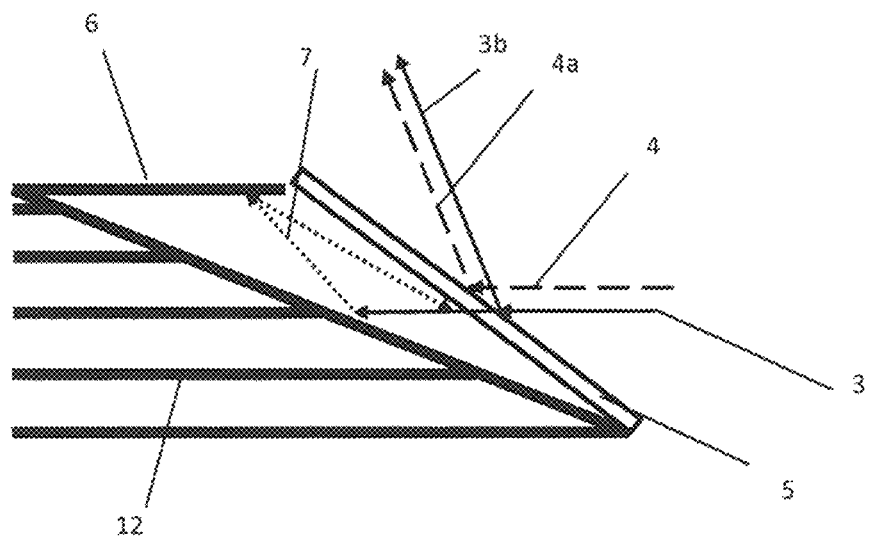
FIG. 13 illustrates how cooling elements on the beam absorber may be located to provide heat dissipation.

A further aspect of the invention is illustrated in FIG. 13, in which cooling elements 12 are provided on the beam absorber 6 for heat dissipation. Laser sources, as are used in NLFC devices, can emit light with high optical powers. Particularly when operated in continuous wave (cw) mode, the heat build-up in beam absorbers is non-negligible and may need active management. By way of example, optical powers of at least 1 W may be incident on a beam absorber.

The addition of cooling elements 12 to increase the surface area of the beam absorber 6 allows for more effective heat dissipation than from a beam absorber fashioned with smaller surface area, such as a cylinder or cuboid shape. This aspect is particularly advantageous when combined with a previous aspect of this invention (configured internal shape of the beam absorber) as the addition of cooling fins does not need to increase the overall profile of the beam absorber, thus keeping the physical size to a minimum. The cooling advantage may be conferred upon any aspect of this invention where a beam absorber is required.

Another aspect of this invention utilises one or more angle-selective light shielding elements configured to block some or all of the scattered light that propagates in approximately the same direction and spatial location as the direction of the onwards propagating beam that includes the second light beam as reflected by the mirror. This aspect is introduced with reference to an example in FIG. 14. Mixed scattered light 7*a* may originate from within the light beam separating and absorbing element or from any component encountered by the first light beam 3 or combined beam 2. The angle-selective light shielding element is configured to allow the onwards propagating beam 2*a* to pass through unobstructed but blocks, and preferably absorbs, scattered light that is not similar in both direction and spatial location to the onwards propagating beam 4*a*. Preferably, any scattered light which would otherwise lead to optical emission of scattered light from the NLFC device is blocked by an angle-selective light shielding element.

Figure 14:
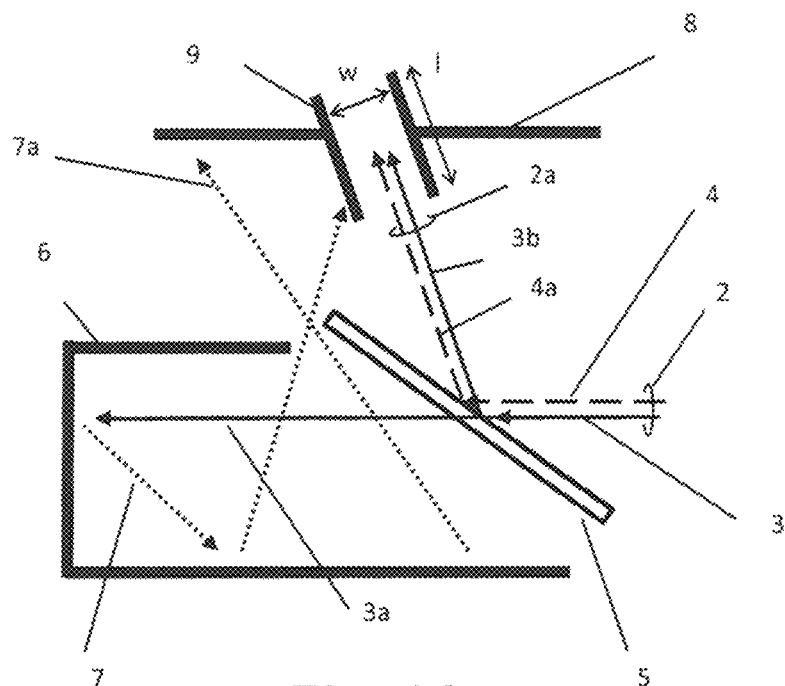
FIG. 14. illustrates how a light shielding element comprising an aperture and light tunnel may be configured to block some or all of the scattered light.

An example of an angle-selective light shielding element is shown in FIG. 14, where the angle-selective light shielding element comprises a light shield layer 8 of an opaque material that blocks the scattered light, with a light tunnel 9, also composed of opaque material, defining a light path that is configured to allow the onwards propagating beam 2*a* to pass through unobstructed.

Figure 15:
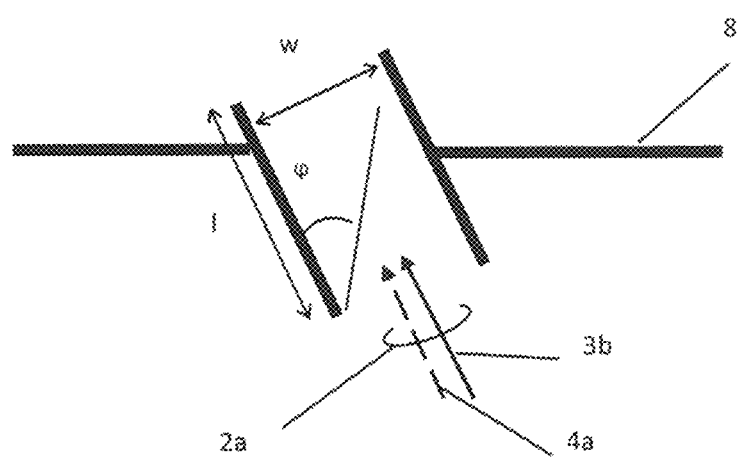
FIG. 15 is extracted from a portion of FIG. 14 and illustrates the relationship between light tunnel geometry and angular acceptance.

The angular acceptance, $\Phi$, of the light tunnel 9 may be controlled by the aspect ratio of the tunnel width, w, to length, l. This is illustrated in FIG. 15 and shows that, assuming the tunnel is angled such that the walls are parallel to the onwards propagating light beam 2*a*, $\Phi$ is defined as;

$$\Phi = \text{(onwards propagating beam angle)} \pm \varphi \qquad (2)$$

Where $$\varphi = \tan^{-1} w/l \qquad (3)$$

Figure 16:
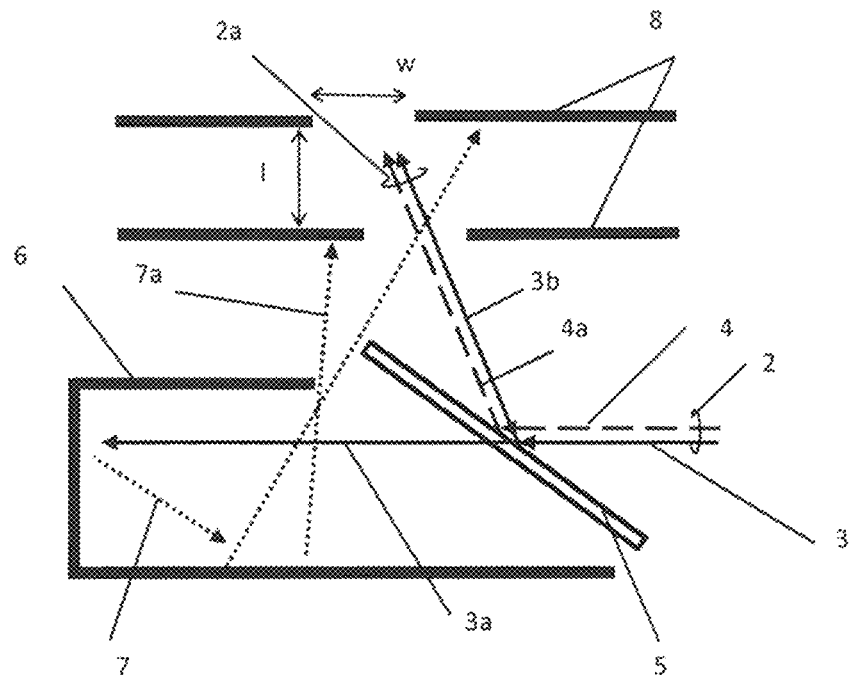
FIG. 16 illustrates how a light shielding element comprising two or more apertures may be configured to block some or all of the scattered light.

A further exemplary angle-selective light shielding element is shown in FIG. 16, in which the light shield comprises two (or more) layers 8 of opaque material, each with an aperture to allow the onwards propagating beam to pass through unobstructed. By separating the light shield layers 8, the angular acceptance of the light shield can be made highly selective. This example is advantageous because the lack of tunnel walls reduces the probability of mixed scattered light 7a scattering within the tunnel.

Figure 17:
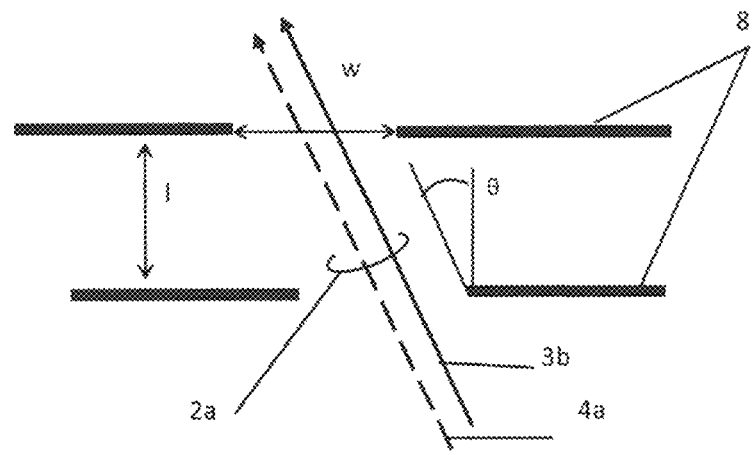
FIG. 17 is extracted from a portion of FIG. 16 and illustrates the relationship between light tunnel geometry and angular acceptance.

The angular acceptance, Φ, may be controlled by the aspect ratio of the aperture width, w, to layer separation, l, in a similar manner to the light tunnel. For an example of a two layer light shield with no optical components in between the light shield layers which would otherwise block or divert the onwards propagating beam or mixed scattered light 7a, and assuming the apertures are positioned such that the onwards propagating light beam 2a passes through the centre of each aperture, Φ is defined as;

$$\Phi = \text{(onwards propagating beam angle)}_{-\varphi2}^{+\varphi1} \quad (4)$$

where $$\varphi1 = \tan^{-1} \frac{\left(\frac{w}{l}\cos\theta\right)}{\left(\frac{1}{\cos\theta} - \frac{w}{l}\sin\theta\right)} \quad (5)$$

and $$\varphi2 = \tan^{-1} \frac{\left(\frac{w}{l}\cos\theta\right)}{\left(\frac{1}{\cos\theta} + \frac{w}{l}\sin\theta\right)} \quad (6)$$

where θ is the angle of the onwards propagating light beam relative to the plane of the light shield, as shown in FIG. 17.

This aspect of the invention is advantageous because the light shield can restrict scattered light from any component in the NLFC device which is encountered by the first light beam 3, combined beam 2, or the transmitted first beam 3a. In particular, however, the angle-selective light shielding element provides a strong advantage when combined with the requirement that the first mirror reduces scattered light from escaping from the beam absorber into approximately the direction and spatial location of the onwards propagating beam. In this case the angle-selective light shielding element provides angular selectivity of the scattered light, which means that less scattered light escaping directly from the beam absorber can propagate past the light shield. This then has a greater capacity to further reduce the mixed scattered light 7a exiting the NLFC device when combined with the aspects which control how the beam absorber is disposed relative to the first mirror.

Examples below describe exemplary embodiments of a non-linear frequency conversion (NLFC) device that includes a light beam separating and absorbing element as described above. Generally, in exemplary embodiments the NLFC device may include a light source that emits the first light beam, an NLFC component that converts a portion of the first light beam into the second light beam, wherein the first and second light beams have different wavelengths (i.e., the NLFC component performs a frequency conversion process to convert a portion of the first light beam into the second light beam), and the light beam separating and absorbing element according to any of the embodiments. The first and second light beams are incident on the light beam separating and absorbing element, and an onward beam propagated from the light beam separating and absorbing element has reduced power of the first light beam relative to power of the first light beam incident on the light beam separating and absorbing element.

Example 1: An NLFC Device with Beam Separating and Absorbing Element

Figure 18:
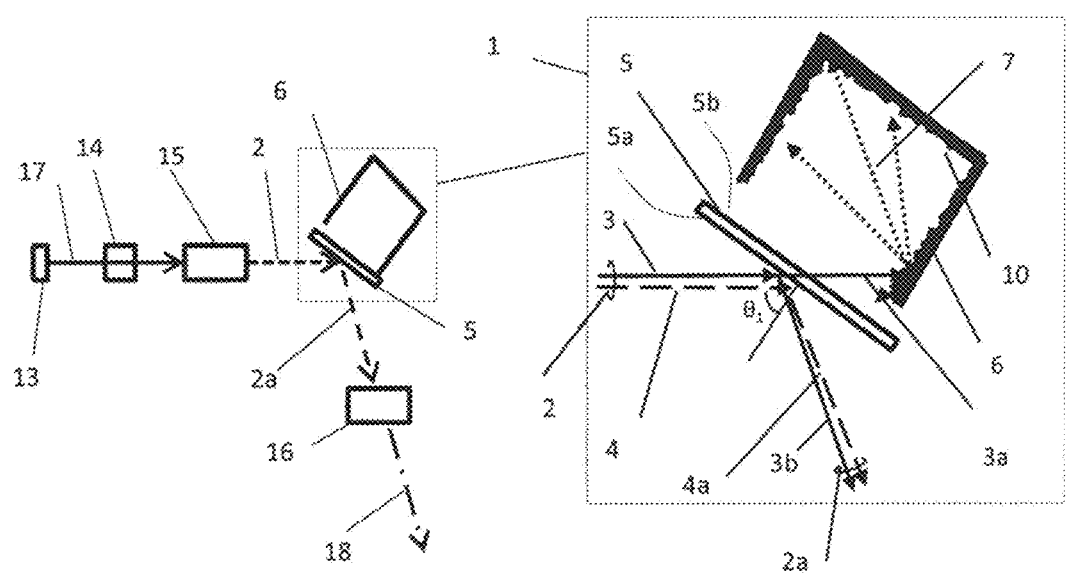
FIG. 18 illustrates an exemplary NLFC device including a light beam separating and absorbing element.

Example 1 of an exemplary NLFC device with light beam separating and absorbing element is illustrated in FIG. 18, which shows laser light 17 emitted from a laser 13. The laser 13 may emit light with a peak wavelength between 400 nm and 600 nm, and may be a laser diode which includes $Al_yIn_xGa_zN$ materials. For the remainder of this example, the laser 13 is a laser diode including $Al_yIn_xGa_zN$ materials which is configured to emit laser light with wavelength of approximately 440 nm. The laser light 17 may propagate through one or more optical elements 14 (for example, one or more lenses), which focus the laser light so that it converges in at least one plane of the light beam as it propagates towards an NLFC element 15. The NLFC element 15 is configured to provide frequency conversion of the laser light 17. In this example, the NLFC element 15 is configured to provide SHG of the laser light 17. The laser light 17 is the fundamental light in the SHG process; some of the laser light 17 is converted into converted light with wavelength equal to half of the wavelength of the fundamental light (i.e. wavelength of the converted light is approximately 220 nm). For laser light 17 with wavelength λ≈440 nm, a suitable choice of NLFC element 15 is $\beta\text{-}BaB_2O_4$ ("β-BBO") configured for phase matched type 1 SHG. Note that throughout this disclosure, wavelengths refer to light propagating in vacuum.

As shown in the close-up portion of FIG. 18, the laser light 17 which is not frequency converted in the NLFC element propagates out of the NLFC element as a first light beam 3. The converted light propagates out of the NLFC element as a second light beam 4. The combined beam 2 comprises the first light beam 3 and the second light beam 4.

For SHG in bulk β-BBO, the power of the converted light is often significantly lower than the power in the fundamental light. For example, in the case of fundamental wavelength of 440 nm (power=$P_{440nm}$), converted wavelength of 220 nm (power=$P_{220nm}$), and $P_{440nm}$≈1 W, a typical value is $P_{220nm}/P_{440nm}$≈$10^{-4}$.

For many applications for 220 nm wavelength laser light, the ratio of power in the converted to fundamental wavelength, $P_{220nm}/P_{440nm}$, needs to be >>1, preferably >$10^3$ and more preferably >$10^4$, and still more preferably >$10^6$. Thus, the ratio $P_{220nm}/P_{440nm}$ in the combined beam 2 exiting the β-BBO NLFC element 15 must be significantly increased, by a factor of ~$10^8$. This is achieved by applying filtering stages to the combined beam 2.

A further requirement of many light sources, not just those utilising NLFC elements to generate output, is that the physical size of the system must be as small as possible; miniaturisation of optical components is a common industry requirement to meet size or weight specifications. This example illustrates how all these requirements may be achieved using compact and effective wavelength separation as part of a filtering process. The first element within the filtering process may be the light beam separating and absorbing element 1, subsequent filtering of the onwards propagating beam 2a may be achieved with a separate filter 16. The resulting output beam 18 then has the desired power ratio $P_{220nm}/P_{440nm}$.

The light beam separating and absorbing element 1 acts on the combined beam 2 after it has exited the NLFC element. The light beam separating and absorbing element comprises a first mirror 5 and beam absorber 6 according to any of the embodiments. Optionally, an optical element such as a lens may be placed in the optical path between the NLFC element and light beam separating and absorbing element. An advantage of not including a lens element in this position is that the combined beam exiting the NLFC element is diverging and this divergence may favourably affect the scattering angle of scattered light within the beam absorber.

As referenced above, the combined light beam comprises the first and second light beams. The first light beam is substantially or entirely of a single polarisation; typically at least 99% of the power in the first light beam has the same polarisation. The second light beam is substantially or entirely of a single polarisation (typically at least 99% of the power has the same polarisation) which is orthogonal to the polarisation of the first light beam.

The first mirror 5 comprises a thin parallel plate with a first surface 5a and second surface 5b. The thickness of the plate (i.e. distance between the first and second surfaces) may be between 0.01 mm and 10 mm, and preferably approximately 1 mm. The combined beam 2 is incident on the first surface 5a such that the majority polarisation of the first light beam is p-polarised with respect to the first surface, and with an angle of incidence $\theta_1$ approximately equal to the Brewster angle. The first mirror 5 includes a material that supports Brewster type reflections for p-type polarised light at the first mirror first surface. In the current example the first mirror includes UV fused silica and the Brewster angle is approximately 56°. Other suitable materials for inclusion in the first mirror include silica, silicon, PMMA, fluoropolymers, and other plastics.

The first surface 5a of the first mirror is configured with a coating to provide reflectivity for the s-polarised second light beam ($\lambda \approx 220$ nm) greater than 50% and preferably greater than 99%, and transmission for the p-polarised first light beam ($\lambda \approx 440$ nm) more than 99% and preferably more than 99.9%. In this example the first surface 5a includes stacked multilayers of durable fluoride materials, for example including lanthanum fluoride ($LaF_3$) and magnesium fluoride ($MgF_2$), but other suitable materials may be used in addition or instead of these to obtain similar reflectivity.

For this example specifically shown in FIG. 18, the second surface 5b of the first mirror 5 does not include a coating as described above. The plot in FIG. 5 shows typical transmission of $\lambda \approx 440$ nm light through the first mirror of this example, and FIG. 3 shows the behaviour with wavelength for light of incidence angle=56°. In another variation the second surface 5b of the first mirror may include such coating as described above. This can be advantageous, for example the second surface 5b may be configured to provide a higher reflectivity for s-polarised scattered light than the coating on the first mirror first surface 5a and, or alternatively, a high reflectivity to angles of incidence outside a few degrees of the Brewster angle. The second surface does not need to provide reflectivity for the $\lambda \approx 220$ nm light, so there is greater design and manufacturing freedom in selection of materials and design for the second surface's coating. For example, the second surface's coating may include multilayers of $SiO_2$ and $Si_3N_4$.

The beam absorber 6 comprises a housing with cavity to receive the incoming transmitted first light beam 3a. In the current example the inner surface 10 of the beam absorber 6 is an anodised aluminium surface, where the anodised coating includes a black dye to facilitate absorption of the transmitted first light beam 3a. The inner surface is configured to absorb the majority of the incident transmitted first light beam 3a, so most of the power in the transmitted first light beam is converted into heat in the beam absorber. The light which is not absorbed is scattered light 7. The first mirror 5 is disposed relative to the beam absorber 6 so that any scattered light which would propagate in approximately the same direction and spatial location as the reflected second beam 4a is incident on the first mirror.

The beam separating and absorbing element may be positioned preferably <10 mm, and more preferably <5 mm from the NLFC element as measured along the optical path of the combined beam. The beam absorber and first mirror will preferably be disposed to ensure that, at a plane oriented perpendicular to the reflected second light beam and placed 20 mm away from the first mirror as measured along the optical path of the reflected second light beam, scattered light which would be incident on the plane within 1 mm radius of the centre of the reflected second light beam is incident on the first mirror second surface. In this context, scattered light which would be incident on the plane is defined as light which would be incident on the plane were it transmitted through the first mirror. More preferably, scattered light which would be incident within 2 mm radius of the centre of the reflected second light beam, and even more preferably scattered light which would be incident within 3 mm radius of the centre of the reflected second light beam, is incident on the first mirror second surface. Most preferably, the beam absorber and first mirror will be disposed to ensure that no scattered light from the beam absorber is able to exit the NLFC device, either along the path of the reflected second beam, or by other paths.

With a reflectivity of the first light beam 3 at the first mirror of <0.1%, the power of the 440 nm light in the onwards propagating beam is reduced compared to the combined beam.

Combined beam: $P_{220nm}/P_{440nm}=10^{-4}$

Onwards propagating beam: $P_{220nm}/P_{440nm}=10^{-1}$

The first mirror is optionally disposed in optical contact with the beam absorber, thus ensuring that any light scattered inside the beam absorber must be incident on the first mirror before exiting the beam absorber.

The internal surface of the beam absorber is optionally further configured so that the average polarisation of any scattered light which is incident on the first mirror (after being scattered or reflected from the inner surface of the beam absorber at least once) has much higher s-type polarisation fraction than for the polarisation of the first light beam incident on the first mirror. The first mirror second surface 5b may be configured with a highly reflective coating to reflect back a higher proportion of this scattered light that is incident on the first mirror second surface. Suitable coatings include multilayer coatings. Thus, scattered light escaping the light beam separating and absorbing element 1 is reduced.

In addition to the advantageous reduction in scattered light in the system, requiring optical contact between the beam absorber and first mirror minimises the space and components required to accommodate the two elements.

With the configuration of Example 1, the ratio of $P_{220nm}/P_{440nm}$ in the onwards propagating beam 2a may be improved to the desired result by a further filtering stage 16 for filtering light of the first beam from the onward beam propagated from the light beam separating and absorbing element.

Figure 19:
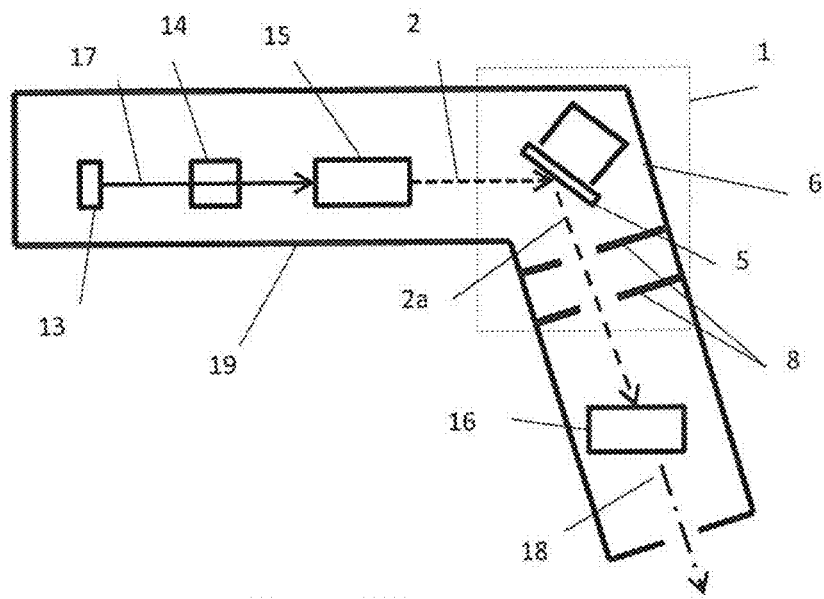
FIG. 19 illustrates an exemplary NLFC device including a light beam separating and absorbing element and light shielding elements.

Example 2: An NLFC Device with Beam Separating and Absorbing Element Including a Light Shield Element In another example of an NLFC device with beam separating and absorbing element, illustrated in FIG. 19, the scattered light in the NLFC device is further reduced by the addition of an angle-selective light shielding element. As illustrated in FIG. 19, in this example there are no optical components between the first mirror 5 and light shield layers of opaque blocking material 8, or between the layers of the light shield, but this does not necessarily need to be the case. For example, the two layers of the light shield could be either side of the filter 16 or other components such as mirrors. Alternatively, other optic elements such as a filter and/or mirror may act on the onward propagating beam between its propagation from the first mirror 5 to the light shield layers.

In this example the angle-selective light shielding element comprises two light shield layers of opaque blocking material 8, for example aluminium layers with anodised coating on both sides. The NLFC device is encased in a suitable device housing 19, and the light shield layers of opaque blocking material 8 are configured to fully partition one side of the internal space of the housing from the other (a typical housing size would be approximately 5-50 cm$^3$ but may be outside that range). In this example the light shield is positioned after the mirror 5, before the filter, 16, and the only apertures in the light shield layers are those needed for the onwards propagating light beam 2a to pass unobstructed from one side of the layers to the other.

The aperture width, w, in the light shield layers must be sufficiently wide to allow the beam 2a to propagate through. Typically this width would be 1-5 times the FWHM of the beam. In this example, a type 1 SHG device producing $\lambda_{converted} \approx 220$ nm in a β-BBO NLFC element 15 has a beam with width <1 mm shortly after exiting the NLFC element, so a suitable range of aperture sizes would be 1-5 mm.

Figure 20:
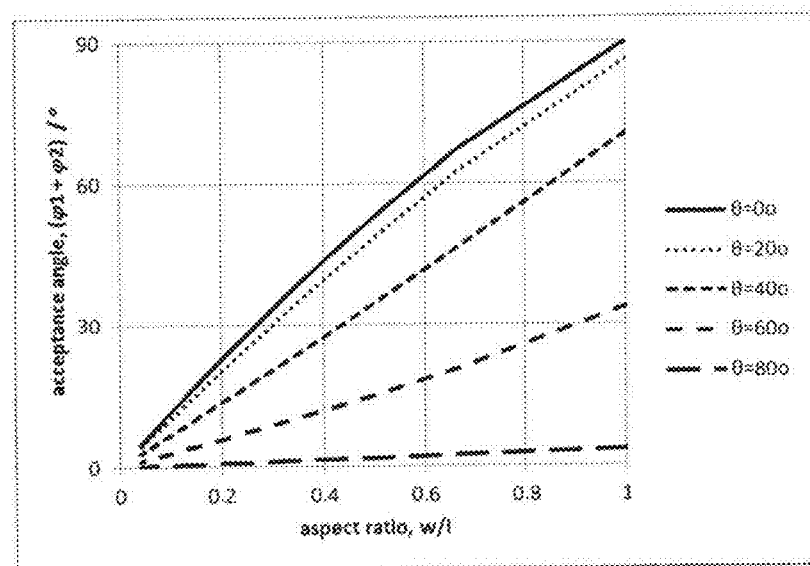
FIG. 20. illustrates how acceptance angle, θ, varies with aspect ratio, w/l, for a two layer light shield such as is illustrated in FIG. 16.

The layer separation of the light shield may then be determined by the required angular acceptance angle of the light shield, which may be calculated from the equations above. For example, if the light shield is aligned with θ=0° (see FIG. 17) and is to have an angular acceptance of (φ1+φ2)=10°, then the aspect ratio must be ~0.09, and l=23 mm for w=2 mm. The angular acceptance varies with θ, as well as aspect ratio w/l, as may be seen in FIG. 20. If θ=60°, then for (φ1+φ2)=10° the aspect ratio must be ~0.33, and l=6 mm for w=2 mm. Thus, for a two-layer light shield, θ may be used either to help choose acceptance angle for a given aspect ratio w/l, or to make the overall space required for the light shield smaller or larger (for example to fit the light shield layers around other components within the NLFC device).

An aspect of the invention, therefore, is a light beam separating and absorbing element. In exemplary embodiments, the light beam separating and absorbing element may include a mirror that receives a first light beam and a second light beam, and the mirror is configured to transmit the first light beam and to reflect the second light beam, and a beam absorber configured to receive the first light beam transmitted through the mirror, and to absorb a first light portion of the first light beam after the first light beam has been transmitted through the mirror. The beam absorber scatters a second portion of the first light beam into scattered light, and the beam absorber and the mirror are disposed relative to each other such that at least a portion of the scattered light is incident on the mirror. The light beam separating and absorbing element may include one or more of the following features, either individually or in combination.

In an exemplary embodiment of the light beam separating and absorbing element, the beam absorber is positioned such that a portion of the scattered light which would overlap the reflected second light beam is incident on the mirror.

In an exemplary embodiment of the light beam separating and absorbing element, the first light beam has a first polarization and the second light beam has a second polarization different from the first polarization; and the mirror is configured to have higher transmissivity of light of the first polarization relative to the second polarization, and higher reflectivity of light of the second polarization relative to the first polarization.

In an exemplary embodiment of the light beam separating and absorbing element, the mirror is positioned such that first light beam is incident on the mirror at the Brewster angle.

In an exemplary embodiment of the light beam separating and absorbing element, the first and second light beams are incident on a first surface of the mirror, and the first surface of the mirror has a coating configured to maximize reflection of the second light beam.

In an exemplary embodiment of the light beam separating and absorbing element, the first and second light beams are incident on a first surface of the mirror, and the scattered light is incident on a second surface of the mirror opposite from the first surface of the mirror; and transmissivity of the mirror for light of the scattered light incident on the second surface of the mirror is lower as compared to transmissivity for light of the first beam incident on the first surface of the mirror.

In an exemplary embodiment of the light beam separating and absorbing element, the first light beam is incident on the first surface of the mirror at a first angle of incidence; the beam absorber is configured such that at least a portion of the scattered light is incident on the second surface of the mirror at a second angle of incidence different from the first angle of incidence; and the transmissivity of the mirror for light of the scattered light is lower at the second angle of incidence as compared to the first angle of incidence.

In an exemplary embodiment of the light beam separating and absorbing element, the second angle of incidence is in approximately a same direction of propagation as a direction of the reflected second light beam as reflected by the mirror, such that the scattered light overlaps with the reflected second beam.

In an exemplary embodiment of the light beam separating and absorbing element, the beam absorber is shaped such that a portion of the scattered light which is scattered in specular directions at one or more surfaces of the beam absorber is incident on the second surface of the mirror at a second angle of incidence different from the first angle of incidence; and the transmissivity of the mirror for the scattered light is lower at the second angle of incidence as compared to the first angle of incidence.

In an exemplary embodiment of the light beam separating and absorbing element, a first surface of the beam absorber is angled at an acute angle relative to a second surface of the beam absorber.

In an exemplary embodiment of the light beam separating and absorbing element, the first light beam is incident on the first surface of the mirror having a first polarization; the beam absorber is configured such that at least a portion of the scattered light is incident on the second surface of the mirror with a second polarization different from the first polarization; and the transmissivity of the mirror for light of the scattered light is lower at the second polarization as compared to the first polarization.

In an exemplary embodiment of the light beam separating and absorbing element, the beam absorber has internal surfaces with a surface texture that changes a fraction of light scattered by the surface texture from the first polarization to the second polarization.

In an exemplary embodiment of the light beam separating and absorbing element, the second surface of the mirror has a coating configured to reduce transmission of scattered light incident on the second surface of the mirror.

In an exemplary embodiment of the light beam separating and absorbing element, the mirror and the beam absorber are at least partially in optical contact with each other to reduce propagation of scattered light from exiting the light beam separating and absorbing element between the mirror and the beam absorber.

In an exemplary embodiment of the light beam separating and absorbing element, the mirror and the beam absorber are entirely in optical contact with each other.

In an exemplary embodiment of the light beam separating and absorbing element, the beam absorber includes cooling elements for heat dissipation.

In an exemplary embodiment of the light beam separating and absorbing element, the element further includes a light shielding element configured to block scattered light that propagates in approximately a same direction of propagation from the beam absorber as a direction of the reflected second light beam as reflected by the mirror, such that the scattered light overlaps with the reflected second light beam.

In an exemplary embodiment of the light beam separating and absorbing element, the light shielding element comprises a light shield layer material that blocks the scattered light, and a light tunnel defining a light path for propagation of an onwards beam that includes the reflected second light beam.

Another aspect of the invention is a non-linear frequency conversion (NLFC) device. In exemplary embodiments, the NLFC device may include a light source that emits a first light beam, an NLFC component that converts a portion of the first light beam into a second light beam, wherein the first and second light beams have different wavelengths, and a light beam separating and absorbing element according to any of the embodiments. The first and second light beams are incident on the light beam separating and absorbing element, and an onward beam propagated from the light beam separating and absorbing element has reduced power of the first light beam relative to power of the first light the incident on the light beam separating and absorbing element. The NLFC device further may include a filter element for filtering light of the first beam from the onward beam propagated from the light beam separating and absorbing element.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

Wavelength separating and absorbing elements in accordance with the present invention may be used in light sources using NLFC, for example ultraviolet light sources. Said light sources may be used as the light source in fluorescence sensors or absorption sensors.

The invention claimed is:

1. A light beam separating and absorbing element comprising:
   a mirror that receives a first light beam and a second light beam, and the mirror is configured to transmit the first light beam and to reflect the second light beam; and
   a beam absorber configured to receive the first light beam transmitted through the mirror, and to absorb a first light portion of the first light beam after the first light beam has been transmitted through the mirror;
   wherein the beam absorber scatters a second portion of the first light beam into scattered light, and the beam absorber and the mirror are disposed relative to each other such that at least a portion of the scattered light is incident on the mirror;
   wherein the beam absorber is positioned such that a portion of the scattered light which would propagate in a same direction as the reflected second light beam is incident on the mirror;
   wherein the first light beam has first polarization and the second light beam has a second polarization different from the first polarization; and
   wherein the mirror is configured to have higher transmissivity of light of the first polarization relative to the second polarization, and higher transmissivity of light of the second polarization relative to the first polarization.

2. The light beam separating and absorbing element of claim 1, wherein the mirror is positioned such that first light beam is incident on the mirror at the Brewster angle.

3. The light beam separating and absorbing element of claim 1, wherein the first and second light beams are incident on a first surface of the mirror, and the first surface of the mirror has a coating configured to maximize reflection of the second light beam.

4. The light beam separating and absorbing element of claim 1, wherein the mirror and the beam absorber are at least partially in optical contact with each other to reduce propagation of scattered light from exiting the light beam separating and absorbing element between the mirror and the beam absorber.

5. The light beam separating and absorbing element of claim 4, wherein the mirror and the beam absorber are entirely in optical contact with each other.

6. The light beam separating and absorbing element of claim 1, wherein the beam absorber includes cooling elements for heat dissipation.

7. The light beam separating and absorbing element of claim 1, further comprising a light shielding element configured to block scattered light that propagates in approximately a same direction of propagation from the beam absorber as a direction of the reflected second light beam as reflected by the mirror, such that the scattered light overlaps with the reflected second light beam.

8. The light beam separating and absorbing element of claim 7, wherein the light shielding element comprises a light shield layer material that blocks the scattered light, and a light tunnel defining a light path for propagation of an onwards beam that includes the reflected second light beam.

9. A non-linear frequency conversion (NLFC) device comprising:
    a light source that emits a first light beam;
    an NLFC component that converts a portion of the first light beam into a second light beam, wherein the first and second light beams have different wavelengths; and
    the light beam separating and absorbing element according to claim 1;
    wherein the first and second light beams are incident on the light beam separating and absorbing element, and an onward beam propagated from the light beam separating and absorbing element has reduced power of the first light beam relative to power of the first light the incident on the light beam separating and absorbing element.

10. The NLFC device of claim 9, further comprising a filter element for filtering light of the first beam from the onward beam propagated from the light beam separating and absorbing element.

11. A light beam separating and absorbing element comprising:
    a mirror that receives a first light beam and a second light beam, and the mirror is configured to transmit the first light beam and to reflect the second light beam; and
    a beam absorber configured to receive the first light beam transmitted through the mirror, and to absorb a first light portion of the first light beam after the first light beam has been transmitted through the mirror;
    wherein the beam absorber scatters a second portion of the first light beam into scattered light, and the beam absorber and the mirror are disposed relative to each other such that at least a portion of the scattered light is incident on the mirror, wherein:
    the first and second light beams are incident on a first surface of the mirror, and the scattered light is incident on a second surface of the mirror opposite from the first surface of the mirror;
    transmissivity of the mirror for light of the scattered light incident on the second surface of the mirror is lower as compared to transmissivity for light of the first beam incident on the first surface of the mirror;
    the first light beam is incident on the first surface of the mirror having a first polarization;
    the beam absorber is configured such that at least a portion of the scattered light is incident on the second surface of the mirror with a second polarization different from the first polarization; and
    the transmissivity of the mirror for light of the scattered light is lower at the second polarization as compared to the first polarization.

12. The light beam separating and absorbing element of claim 11, wherein: the first light beam is incident on the first surface of the mirror at a first angle of incidence;
    the beam absorber is configured such that at least a portion of the scattered light is incident on the second surface of the mirror at a second angle of incidence different from the first angle of incidence; and
    the transmissivity of the mirror for light of the scattered light is lower at the second angle of incidence as compared to the first angle of incidence.

13. The light beam separating and absorbing element of claim 12, wherein the second angle of incidence is in approximately a same direction of propagation as a direction of the reflected second light beam as reflected by the mirror, such that the scattered light overlaps with the reflected second beam.

14. The light beam separating and absorbing element of claim 12, wherein the beam absorber is shaped such that a portion of the scattered light which is scattered in specular directions at one or more surfaces of the beam absorber is incident on the second surface of the mirror at a second angle of incidence different from the first angle of incidence; and
    the transmissivity of the mirror for the scattered light is lower at the second angle of incidence as compared to the first angle of incidence.

15. The light beam separating and absorbing element of claim 14, wherein a first surface of the beam absorber is angled at an acute angle relative to a second surface of the beam absorber.

16. The light beam separating and absorbing element of claim 11, wherein the beam absorber has internal surfaces with a surface texture that changes a fraction of light scattered by the surface texture from the first polarization to the second polarization.

17. The light beam separating and absorbing element of claim 11, wherein the second surface of the mirror has a coating configured to reduce transmission of scattered light incident on the second surface of the mirror.

18. A non-linear frequency conversion (NLFC) device comprising:
    a light source that emits a first light beam;
    an NLFC component that converts a portion of the first light beam into a second light beam, wherein the first and second light beams have different wavelengths; and
    the light beam separating and absorbing element according to claim 11;
    wherein the first and second light beams are incident on the light beam separating and absorbing element, and an onward beam propagated from the light beam separating and absorbing element has reduced power of the first light beam relative to power of the first light the incident on the light beam separating and absorbing element.

19. The NLFC device of claim 18, further comprising a filter element for filtering light of the first beam from the onward beam propagated from the light beam separating and absorbing element.

* * * * *